United States Patent Office 2,838,513
Patented June 10, 1958

2,838,513
METHOD FOR THE PREPARATION OF 3:6-DIHYDRAZINO-PYRIDAZINE

Jean Druey, Riehen, Switzerland, assignor to Ciba Pharmaceutical Products, Inc., Summit, N. J.

No Drawing. Application August 13, 1953
Serial No. 374,120

Claims priority, application Switzerland August 20, 1952

2 Claims. (Cl. 260—250)

This invention relates to 3:6-dihydrazino-pyridazine of the formula

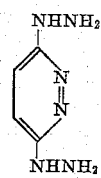

and its salts.

This compound possesses valuable pharmacological properties. It is distinguished especially by a prolonged and very strong blood pressure reducing effect.

The invention also embraces the process for preparing the novel compound as well as the novel intermediates, 3:6-dimercapto-pyridazine and 3:6-dichloro-pyridazine employed in the process.

According to the process of the invention 3:6-dihydrazino-pyridazine is obtained, when 3:6-dimercapto-pyridazine is reacted with hydrazine. The reaction is advantageously carried out in the presence of diluents, such as lower alkanols, e. g. ethanol, preferably at an elevated temperature. The novel intermediate, 3:6-dimercapto-pyridazine can be prepared by heating 3:6-dihydroxy-pyridazine with phosphorus oxychloride and the obtained 3:6-dichloro-pyridazine, which is also a novel compound with an alcoholic solution of potassium bisulfide.

Depending upon the method of preparation, the new hydrazine compound is obtained in the form of the free base or its salts. From the latter in the customary manner, the free base can be produced. From the base, e. g. by reaction with the acids suitable for the preparations of therapeutically useful and non-toxic acid addition salts, such as the hydrohalic acids, sulfonic acid, nitric acid, phosphoric acid, acetic acid, propionic acid, oxalic acid, malic acid, citric acid, methane sulfonic acid, ethane sulfonic acid, hydroxyethane sulfonic acid, benzoic acid, salicylic acid, p-amino-salicylic acid, benzene- or toluene sulfonic acid, the corresponding therapeutically useful and non-toxic salts are obtained, namely, the hydrohalides, sulfates, nitrate, phosphate, acetate, propionate, oxalate, malate, citrate, methane sulfonate, ethane sulfonate, hydroxy-ethane sulfonate, benzoate, salicylate, p-amino-salicylate or benzene or toluene sulfonate.

The following example illustrates the invention, the relations between part by weight and part by volume being the same as the between the gram and the cubic centimeter:

Example 2 parts by weight of 3:6-dimercapto-pyridazine are boiled under reflux for 6 hours in a mixture of 10 parts by volume of absolute ethyl alcohol and 10 parts by volume of hydrazine hydrate, in which operation hydrogen sulfide is evolved. On allowing the reaction mixture to stand overnight at 0° C. 1.5 parts by weight of 3:6-dihydrazino-pyridazine of the formula

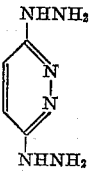

crystallize out. When recrystallized once from a little 50 percent ethyl alcohol, the product is obtained pure. The melting point is 193–195° C. with decomposition.

From the base, with 1 or 2 equivalents of sulfuric acid the corresponding sulfates are produced. The acid sulfate is thus obtained, for example, as follows:

0.42 part by weight of the base is dissolved hot in 1.36 parts by volume of 2.2-normal sulfuric acid and the solution allowed to cool. The crystallizate is filtered with suction, dried and recrystallized from aqueous alcohol of 50 percent strength. It melts at about 215° C. with decomposition. The mono-nitrate is obtained from the base with 1 equivalent of 2-normal nitric acid. It melts at 191–192° C. with decomposition and is fairly easily soluble in water. The 3:6-dimercapto-pyridazine used as starting material may be prepared as follows:

50 parts by weight of 3:6-dihydroxy-pyridazine and 150 parts by volume of phosphorus oxychloride are heated for 1½ hours on a boiling water bath while being rotated from time to time. The phosphorus oxychloride in excess is distilled off in vacuo to a considerable degree and the residue poured on to about 200 parts by weight of ice. While cooling externally the whole is neutralized immediately with concentrated ammonia the temperature being maintained below 30–35° C. The whole is finally cooled in ice, filtered with suction, the residue washed with a little cold water and dried. The crude 3:6-dichloro-pyridazine thus obtained is dissolved warm in 10 parts by volume of cyclohexane for purification, filtered off with animal carbon from insoluble impurities and allowed to crystallize out while stirring in the cold. 3:6-dichloro-pyridazine melting at 65–68° C. is thus obtained.

10 parts by weight of this product and 110 parts by volume of 2-normal alcoholic potassium bisulfide solution are heated in a bomb tube for 6 hours at 140–150° C. After cooling the whole is filtered with suction. The resulting product is dissolved in 150 parts by volume of warm water, the solution clarified with animal carbon and the dimercapto-compound precipitated out at about 50° C. with dilute hydrochloric acid (1:1). After cooling, the whole is filtered with suction, washed with water and dried at 60° C. There is thus obtained 3:6-dimercapto-pyridazine of the formula

melting at approximately 220–240° C. with decomposition; it is purified by being dissolved in a solution of sodium bicarbonate and precipitated out with dilute hydrochloric acid.

What is claimed is:
1. A process which comprises reacting 3:6-dimercapto-pyridazine with hydrazine.
2. 3:6-dimercapto-pyridazine.

References Cited in the file of this patent
UNITED STATES PATENTS 2,484,785    Druey _____ Oct. 11, 1949